United States Patent
Solodky et al.

(10) Patent No.: US 12,032,060 B2
(45) Date of Patent: Jul. 9, 2024

(54) AMBIGUITY MITIGATION BASED ON COMMON FIELD OF VIEW OF RADAR SYSTEMS

(71) Applicant: GM Global Technology Operations LLC, Detroit, MI (US)

(72) Inventors: Gaston Solodky, Kfar Saba (IL); Ishai Eljarat, Raanana (IL); Igal Bilik, Rehovot (IL); Gonen Barkan, Lehavim (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 709 days.

(21) Appl. No.: 17/157,060

(22) Filed: Jan. 25, 2021

(65) Prior Publication Data
US 2022/0236409 A1    Jul. 28, 2022

(51) Int. Cl.
| | | |
|---|---|---|
| *G01S 15/89* | (2006.01) | |
| *G01S 7/539* | (2006.01) | |
| *G01S 15/42* | (2006.01) | |
| *G01S 15/87* | (2006.01) | |

(52) U.S. Cl.
CPC .............. *G01S 15/89* (2013.01); *G01S 7/539* (2013.01); *G01S 15/42* (2013.01); *G01S 15/87* (2013.01)

(58) Field of Classification Search
None
See application file for complete search history.

(56) References Cited

U.S. PATENT DOCUMENTS

| | | | |
|---|---|---|---|
| 2019/0041503 A1* | 2/2019 | Shand | G01S 17/42 |
| 2019/0353784 A1* | 11/2019 | Toledano | G01S 17/86 |
| 2020/0180612 A1* | 6/2020 | Finelt | G05D 1/0088 |

* cited by examiner

*Primary Examiner* — Whitney Moore
(74) *Attorney, Agent, or Firm* — CANTOR COLBURN LLP

(57) ABSTRACT

A method includes obtaining an initial point cloud for each of two or more radar systems that share a common field of view. Each initial point cloud results from processing reflected energy at each of the two or more radar systems. Each point of the initial point cloud indicates one or more hypotheses for a range, a Doppler, and a direction of arrival (DOA) to an object that resulted in the reflected energy. A point cloud, obtained from the initial point cloud, has a same number of hypotheses for the range, the Doppler, and the DOA. Resolving ambiguity in the common field of view is based on the point clouds to obtain resolved and unresolved points in the common field of view. A radar image obtained from each of the two or more radar systems is used to control an aspect of operation of a vehicle.

20 Claims, 4 Drawing Sheets

AMBIGUITY MITIGATION BASED ON COMMON FIELD OF VIEW OF RADAR SYSTEMS

INTRODUCTION

The subject disclosure relates to ambiguity mitigation based on a common field of view of radar systems.

Vehicles (e.g., automobiles, trucks, construction equipment, automated factory equipment) employ sensors to perform semi-autonomous or autonomous operation. Exemplary sensors (e.g., camera, radar system, lidar system, inertial measurement unit, accelerometer) provide information about the vehicle and its surroundings. Exemplary semi-autonomous operations include adaptive cruise control (ACC) and collision avoidance. A radar system generally transmits a radio frequency (RF) signal and receives reflected energy as a result of the transmitted signal encountering one or more objects. Processing the reflected energy provides a point cloud with each point being associated with range, direction of arrival (DOA) (e.g., azimuth angle and elevation angle to the object), and Doppler (range rate). Rather than indicating a single range, DOA, and Doppler for the object, each point may be associated with two or more hypotheses for a range value, two or more hypotheses for a DOA value, and two or more hypotheses for a Doppler value. In order to perform detection using the point cloud, the ambiguity created by the hypotheses must first be resolved. Accordingly, it is desirable to provide ambiguity mitigation based on a common field of view of radar systems.

SUMMARY

In one exemplary embodiment, a method includes obtaining an initial point cloud for each of two or more radar systems that share a common field of view. Each initial point cloud results from processing reflected energy at each of the two or more radar systems and each point of the initial point cloud indicates one or more hypotheses for a range, a Doppler, and a direction of arrival (DOA) to an object that resulted in the reflected energy. The method also includes obtaining a point cloud from the initial point cloud for each of the two or more radar systems. Each point of the point cloud for each of the two or more radar systems has a same number of hypotheses for the range as other points of the point cloud, a same number of hypotheses for the Doppler as other points of the point cloud, and a same number of hypotheses for the DOA as other points of the point cloud. Ambiguity in the common field of view is resolved based on the point cloud for each of the two or more radar systems to obtain resolved and unresolved points in the common field of view. The resolved points indicate one value for the range, one value for the Doppler, and one value of the DOA. A radar image is obtained from each of the two or more radar systems based on the resolved and unresolved points in the common field of view, wherein the radar images are used to control an aspect of operation of a vehicle.

In addition to one or more of the features described herein, the obtaining the point cloud from the initial point cloud includes, for each initial point cloud, determining a number of hypotheses for the range, a number of hypotheses for the Doppler, and a number of hypotheses for the DOA of each point of each initial point cloud, outputting the initial point cloud as the point cloud based on the number of hypotheses for the range being a first number for every point, the number of hypotheses for the Doppler being a second number for every point, and the number of hypotheses for the DOA being a third number for every point, and processing the initial point cloud to obtain the point cloud based on the number of hypotheses for the range being less than the first number for at least one point, the number of hypotheses for the Doppler being less than the second number for at least one point, or the number of hypotheses for the DOA being less than the third number for at least one point.

In addition to one or more of the features described herein, the processing the initial point cloud includes generating a subset of the initial point cloud to include each point that has fewer than the first number of hypotheses for the range, the second number of hypotheses for the Doppler, and the third number of hypotheses for the DOA and using an ambiguity function to obtain a complete subset of the initial point cloud that includes the first number of hypotheses for the range, the second number of hypotheses for the Doppler, and the third number of hypotheses for the DOA for each point in the subset of the initial point cloud.

In addition to one or more of the features described herein, the processing the initial point cloud includes obtaining a Mahalanobis distance between each point in the subset of the initial point cloud and each hypothesis in the complete subset of the initial point cloud and, based on the Mahalanobis distance, identifying each point in the subset of the initial point cloud that is a hypothesis in the complete subset of the initial point cloud.

In addition to one or more of the features described herein, the processing the initial point cloud includes discarding each point in the subset of the initial point cloud that is the hypothesis in the complete subset of the initial point cloud from the complete subset of the initial point cloud and retaining a remainder of the complete subset of the initial point cloud to generate the point cloud.

In addition to one or more of the features described herein, the method also includes identifying each point in the point cloud of each of the two or more radar systems that is in the common field of view.

In addition to one or more of the features described herein, the resolving the ambiguity in the common field of view includes obtaining, using the points in the common field of view for one of the two or more radar systems and another of the two or more radar systems at a time, a Mahalanobis distance between each hypothesis set of each point in the common field of view for the one of the two or more radar systems and each hypothesis set of each point in the common field of view for the other of the two or more radar systems, the hypothesis set including one combination of one of the one or more hypotheses for the range, one of the one or more hypotheses for the Doppler, and one of the one or more hypotheses for the DOA.

In addition to one or more of the features described herein, the resolving the ambiguity in the common field of view includes identifying a pair of points that result in a lowest Mahalanobis distance and, based on the pair of points passing a gating condition, retaining only the hypothesis set of the pair of points that is associated with the lowest Mahalonobis distance as unambiguous.

In addition to one or more of the features described herein, checking the gating condition for the pair of points includes using each of the range, the Doppler, and the DOA of the hypothesis set of the pair of points.

In addition to one or more of the features described herein, one or more objects is identified based on the radar image of one or more of the two or more radar systems.

In another exemplary embodiment, a vehicle includes two or more radar systems. The vehicle also includes a controller to obtain an initial point cloud for each of two or more radar systems that share a common field of view. Each initial point cloud results from processing reflected energy at each of the two or more radar systems and each point of the initial point cloud indicates one or more hypotheses for a range, a Doppler, and a direction of arrival (DOA) to an object that resulted in the reflected energy. The controller obtains a point cloud from the initial point cloud for each of the two or more radar systems. Each point of the point cloud for each of the two or more radar systems has a same number of hypotheses for the range as other points of the point cloud, a same number of hypotheses for the Doppler as other points of the point cloud, and a same number of hypotheses for the DOA as other points of the point cloud. The controller resolves ambiguity in the common field of view based on the point cloud for each of the two or more radar systems to obtain resolved and unresolved points in the common field of view. The resolved points indicate one value for the range, one value for the Doppler, and one value of the DOA, and to obtain a radar image from each of the two or more radar systems based on the resolved and unresolved points in the common field of view. The radar images are used to control an aspect of operation of a vehicle.

In addition to one or more of the features described herein, for each initial point cloud, the controller obtains the point cloud by determining a number of hypotheses for the range, a number of hypotheses for the Doppler, and a number of hypotheses for the DOA of each point of each initial point cloud, outputting the initial point cloud as the point cloud based on the number of hypotheses for the range being a first number for every point, the number of hypotheses for the Doppler being a second number for every point, and the number of hypotheses for the DOA being a third number for every point, and processing the initial point cloud to obtain the point cloud based on the number of hypotheses for the range being less than the first number for at least one point, the number of hypotheses for the Doppler being less than the second number for at least one point, or the number of hypotheses for the DOA being less than the third number for at least one point.

In addition to one or more of the features described herein, the controller processes the initial point cloud by generating a subset of the initial point cloud to include each point that has fewer than the first number of hypotheses for the range, the second number of hypotheses for the Doppler, and the third number of hypotheses for the DOA and using an ambiguity function to obtain a complete subset of the initial point cloud that includes the first number of hypotheses for the range, the second number of hypotheses for the Doppler, and the third number of hypotheses for the DOA for each point in the subset of the initial point cloud.

In addition to one or more of the features described herein, the controller processes the initial point cloud by obtaining a Mahalanobis distance between each point in the subset of the initial point cloud and each hypothesis in the complete subset of the initial point cloud and, based on the Mahalanobis distance, identifying each point in the subset of the initial point cloud that is a hypothesis in the complete subset of the initial point cloud.

In addition to one or more of the features described herein, the controller processes the initial point cloud by discarding each point in the subset of the initial point cloud that is the hypothesis in the complete subset of the initial point cloud from the complete subset of the initial point cloud and retaining a remainder of the complete subset of the initial point cloud to generate the point cloud.

In addition to one or more of the features described herein, the controller identifies each point in the point cloud of each of the two or more radar systems that is in the common field of view.

In addition to one or more of the features described herein, the controller resolves the ambiguity in the common field of view by obtaining, using the points in the common field of view for one of the two or more radar systems and another of the two or more radar systems at a time, a Mahalanobis distance between each hypothesis set of each point in the common field of view for the one of the two or more radar systems and each hypothesis set of each point in the common field of view for the other of the two or more radar systems, the hypothesis set including one combination of one of the one or more hypotheses for the range, one of the one or more hypotheses for the Doppler, and one of the one or more hypotheses for the DOA.

In addition to one or more of the features described herein, the controller resolves the ambiguity in the common field of view by identifying a pair of points that result in a lowest Mahalanobis distance and, based on the pair of points passing a gating condition, retaining only the hypothesis set of the pair of points that is associated with the lowest Mahalanobis distance as unambiguous.

In addition to one or more of the features described herein, the controller checks the gating condition for the pair of points includes using each of the range, the Doppler, and the DOA of the hypothesis set of the pair of points.

In addition to one or more of the features described herein, the controller identifies one or more objects based on the radar image of one or more of the two or more radar systems.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
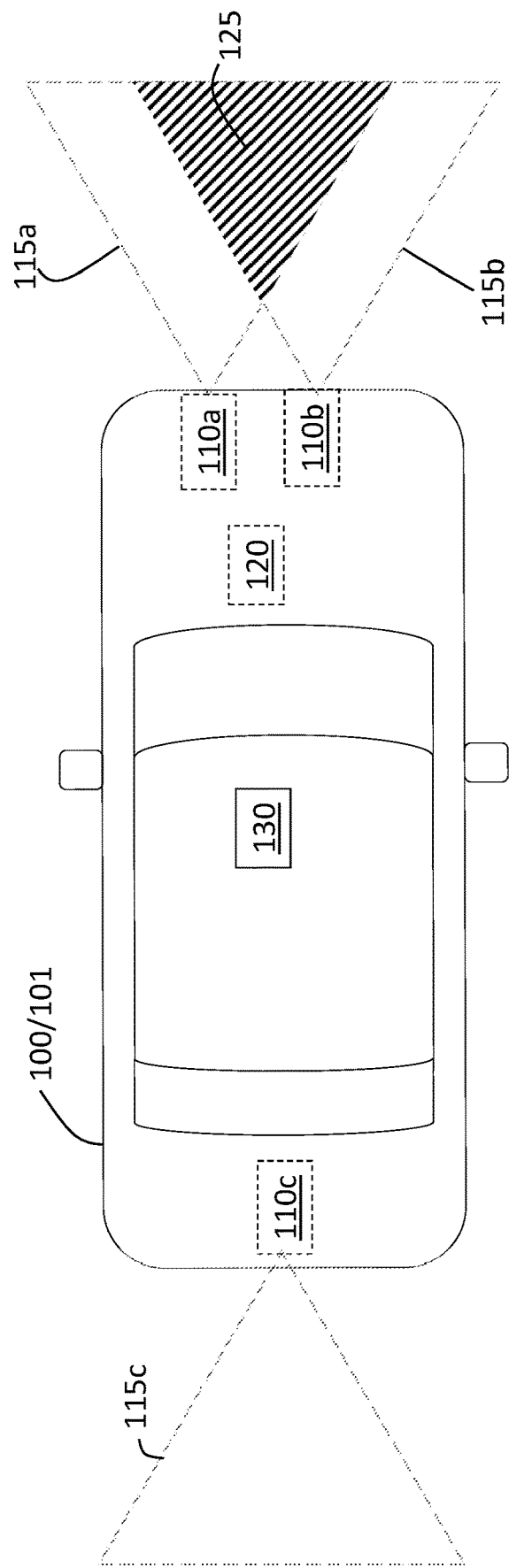
FIG. 1 is a block diagram of a vehicle that includes ambiguity mitigation based on a common field of view of radar systems.

The following description is merely exemplary in nature and is not intended to limit the present disclosure, its application or uses. It should be understood that throughout the drawings, corresponding reference numerals indicate like or corresponding parts and features.

As previously noted, processing reflected energy received by a radar system facilitates obtaining range, DOA, and Doppler to the object that resulted in the reflections. As also noted, the point cloud obtained by processing radar data may include ambiguity such that each point in the point cloud includes two or more hypotheses of range, DOA, and Doppler. The hypotheses in one or more domains (i.e., range, Doppler, DOA) may be a result of waveform parameters, the transmission regime, the antenna pattern, grating lobes, or elevated sidelobe levels. As such, a each point of a point cloud obtained by the same radar system is expected to have the same number of hypotheses in each domain. For example, each point of the point cloud for a given radar system may be expected to have two hypotheses for range, three hypotheses for Doppler, one hypothesis (i.e., no ambiguity) for DOA. Embodiments of the systems and methods detailed herein relate to ambiguity mitigation based on a common field of view of radar systems. When the field of view of two or more radar systems overlaps, ambiguity associated with points in the point clouds corresponding with the overlap region (i.e., common field of view) may be resolved through a selection of the best hypothesis.

In accordance with an exemplary embodiment, FIG. 1 is a block diagram of a vehicle 100 that includes ambiguity mitigation based on a common field of view 125 of radar systems 110a, 110b. The exemplary vehicle 100 shown in FIG. 1 is an automobile 101. Three radar systems 110a, 110b, 110c (generally referred to as 110) are shown with corresponding fields of view 115a, 115b, 115c (generally referred to as 115). As illustrated, the field of view (FOV) 115a corresponding with the radar system 110a and the FOV 115b corresponding with the radar system 110b share a common region indicated as the common FOV 125. The FOV 115c of the radar system 110c does not have any portion in common with the fields of view 115a, 115b of the radar systems 110a, 110b. In addition to the radar systems 110, the vehicle 100 may include additional sensors 130 (e.g., cameras, lidar systems). The number of radar systems 110, their locations around the vehicle 100, and the number of radar systems 110 whose FOV 115 is part of one or more common FOV 125, as well as the numbers and locations of the additional sensors 130, are not intended to be limited by the exemplary illustration in FIG. 1.

The vehicle 100 includes a controller 120 that may obtain information from the radar systems 110 and additional sensors 130 to control aspects of operation of the vehicle 100. The controller 120, alone or in combination with processing circuitry of each radar system 110, may also perform ambiguity mitigation according to one or more embodiments that are detailed herein. The controller 120 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
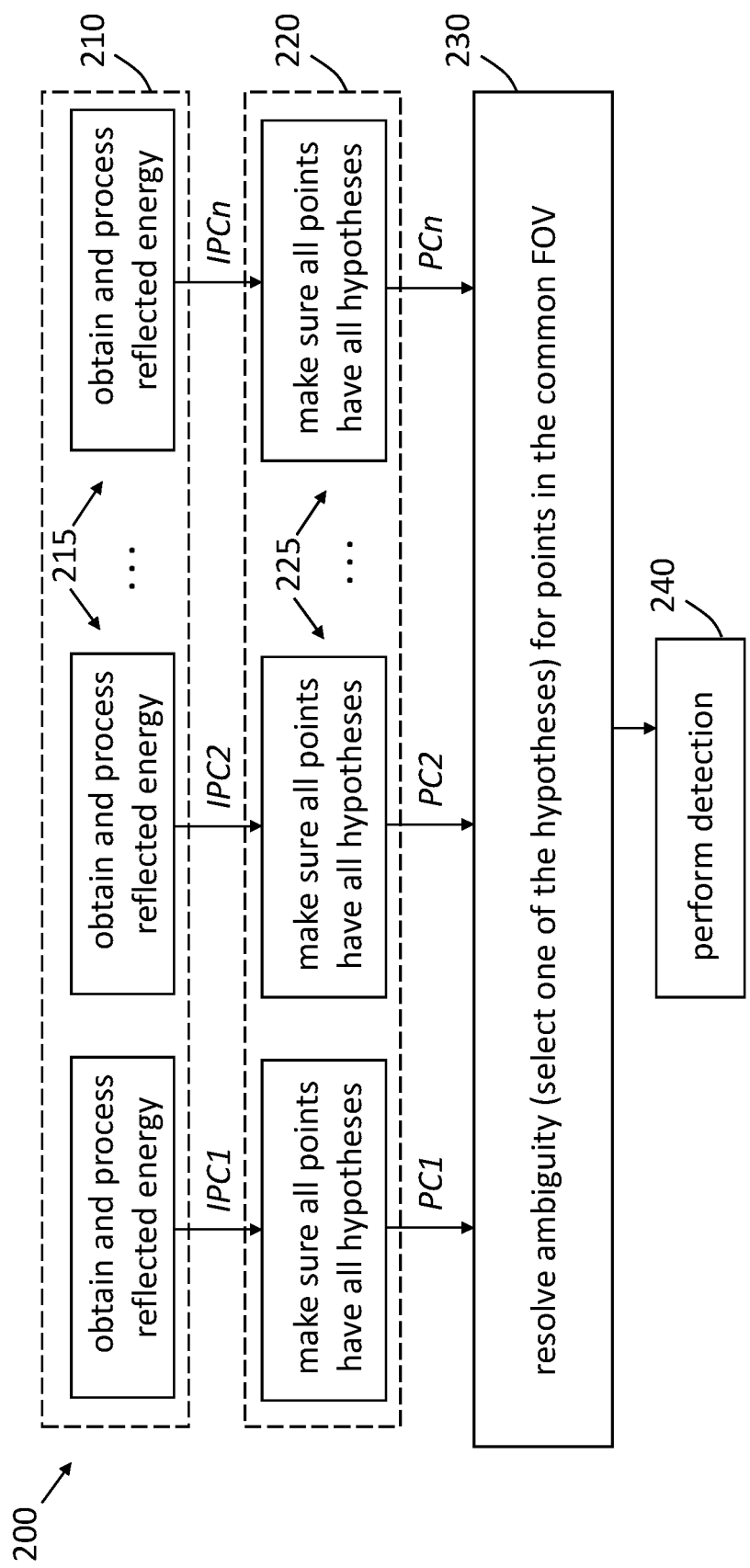
FIG. 2 is a process flow of a method of performing ambiguity mitigation based on a common field of view of radar systems according to one or more embodiments.

FIG. 2 is a process flow of a method 200 of performing ambiguity mitigation based on a common field of view 125 of radar systems 110 according to one or more embodiments. The method 200 may be performed by the controller 120 of the vehicle 100 alone or in combination with processing circuitry that is part of the radar systems 110. At block 210, the processes at block 215 are performed at each of the radar systems 110 whose FOV 115 overlaps with a common FOV 125. In general, the processes at block 215 are performed for every radar system 110 regardless of any overlap in its FOV 115, but only radar systems 110 associated with one or more common FOV 125 are relevant to the discussion of one or more embodiments. A given radar system 110 may have a FOV 115 that overlaps with the fields of view 115 of two or more other radar systems 110. Further, the radar systems 110 of a given vehicle 100 may have multiple common FOV 125. The processes performed at blocks 210 and 220 apply to every radar system 110 whose FOV 115 overlaps with the FOV 115 of another radar system 110 (i.e., every radar system 110 associated with at least one common FOV 125). The processes at block 230 are performed in consideration of one common FOV 125 at a time, as further detailed.

At block 215, for each radar system 110 whose FOV 115 is part of a common FOV 125, the processes include obtaining and processing reflected energy. These processes are well-known and one exemplary embodiment of processing reflected energy is briefly outlined here. As previously noted, RF energy is transmitted and reflected energy is received at each of the radar systems 110. Generally, two fast Fourier transforms (FFTs) are performed on the received reflected energy. The first FFT is along range and the second FFT is along Doppler, which corresponds with radial velocity. More specifically, the first (range) FFT is performed per transmit signal to implement a range match filter processing. The second (Doppler) FFT is performed per each range bin of the first FFT result for all the simultaneously transmitted signals to implement a Doppler match filter processing.

Following the FFTs, a range-Doppler map is obtained. In the case of a multi-input multi-output (MIMO) radar system 110 with multiple transmit elements and multiple receive elements, a range-Doppler map is obtained for each combination of transmit element and receive element. Each range-Doppler map indicates a set of range bins, a set of Doppler bins, and an intensity associated with each range bin and Doppler bin combination. A beamforming process is performed on the range-Doppler map estimate (i.e., to obtain direction of arrival (DOA)) for each bin direction. Following the beamforming, a range-Doppler-beam map is obtained. A detection process in done over the range-Doppler-beam map to obtain detections that are associated with objects. A detection is a point of the initial point cloud IPC and has a corresponding one or more hypotheses for range, Doppler, and DOA associated with it.

At block 210, after the initial point cloud IPC is obtained for each radar system 110 according to block 215, then, at block 220, the processes at blocks 225 are performed individually for each radar system 110. At block 225, the processes include making sure all the points of the initial point cloud IPC have all the expected hypotheses. For a given radar system 110, all the points of the initial point cloud IPC generally should have the same number of hypotheses. The number of hypotheses expected for each point in the initial point cloud may typically be different for each radar system 110 (e.g., six hypotheses for each point of IPC1, four hypotheses for each point of IPC2). For example, every point of the initial point cloud IPC1 may be expected to include two range hypotheses (R1, R2), one Doppler hypothesis (D1), and three DOA hypotheses (DOA1, DOA2, DOA3). As a result, each point of the initial point cloud IPC1 is expected to be associated with six combinations (i.e., six hypotheses (H1 through H6)) shown in Table 1.

TABLE 1

Exemplary hypotheses H for points of an initial point cloud IPC.

| H1 | R1-D1-DOA1 |
| H2 | R1-D1-DOA2 |
| H3 | R1-D1-DOA3 |
| H4 | R2-D1-DOA1 |

TABLE 1-continued

Exemplary hypotheses H for points of an initial point cloud IPC.

| H5 | R2-D1-DOA2 |
|---|---|
| H6 | R2-D1-DOA3 |

Generally, an initial point cloud IPC may have the expected number of hypotheses for either every point or none of the points. For explanatory purposes, an initial point cloud IPC with a mix of points with and without the expected number of hypotheses is discussed with reference to FIG. 3. At block 225, one or more points of the initial point cloud IPC1 may be found not to have all the expected hypotheses (e.g., a point in IPC1 has only one or two hypotheses instead of six). In this case, a check is done to determine if the point is not a point of the initial point cloud IPC1 at all but, instead, is a hypothesis of another legitimate point of the initial point cloud IPC1. If, based on the check, the point is not found to be a hypothesis of another point, then the correct number of hypotheses may be obtained by using the known ambiguity function. The processes at block 225 are further detailed with reference to FIG. 3.

The output of block 220 is point clouds PC that result from ensuring that each initial point cloud IPC obtained at each radar system 110 has the complete set of hypotheses for each point. For a given radar system 110, the input initial point cloud IPC and the output point cloud PC may be the same. This is true if each point of the initial point cloud IPC already has the expected number of hypotheses. At block 230, resolving ambiguity for points in a common FOV 125 refers to selecting one of the hypotheses and discarding the rest prior to performing detection. This selection is further detailed with reference to FIG. 4.

As previously noted, different ones of the radar systems 110 may share different common FOV 125. For example, a radar system 110 may have a FOV 115 with a portion that overlaps with the FOV 115 of a second radar system 110 (i.e., a first common FOV 125) and also a separate portion that overlaps with the FOV 115 of a third radar system 110 (i.e., a second common FOV 125). The processes at block 230 are performed separately for each different common FOV 125 (i.e., differently for the first common FOV 125 and for the second common FOV 125). Thus, points from point clouds PC of two or more radar systems 110 that are part of a given common FOV 125 are considered in turn at block 230. Once at least some of the ambiguities are resolved at block 230, additional known detection processes may be performed, at block 240.

That is, each radar system 110 provides a point cloud. Based on the one or more embodiments discussed herein, some of the points of the point cloud (i.e., some of the points that are part of the common FOV 125) may unambiguously indicate range, Doppler, and DOA. The point cloud from each radar system 110 essentially provides an image of the field of view 115 corresponding with the radar system 110. That image may be used to identify a type of object (e.g., person, another vehicle). The images indicated by the point clouds of radar systems 110 with a common FOV 125 may used to determine accuracy (e.g., the two radar systems 110 indicate different ranges for portions of the same person in their respective images).

Figure 3:
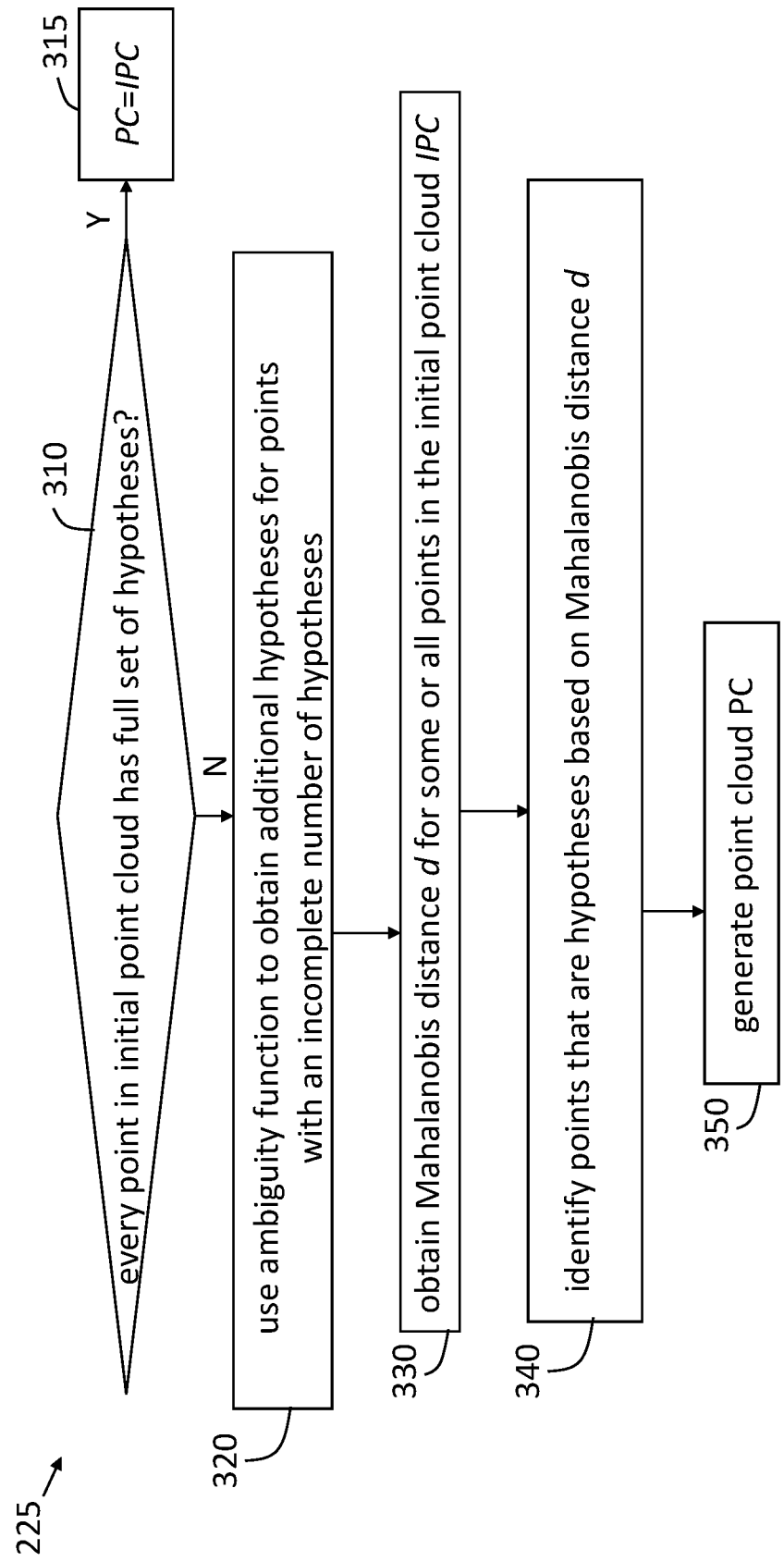
FIG. 3 indicates processes performed for a part of the process flow shown in FIG. 2 for each radar system according to one or more embodiments.

FIG. 3 shows a process flow performed at block 225 (FIG. 2) for each radar system 110 according to one or more embodiments. As previously noted, the processes at block 225 are performed for each radar system 110 individually and begin with the initial point cloud IPC. At block 310, a check is first done of whether every point in the initial point cloud IPC of the given radar system 110 has a full set of hypotheses. If so, then the initial point cloud IPC is the point cloud PC for the radar system 110, at block 315. If every point of the initial point cloud IPC does not have the full set of hypotheses (i.e., the same number of range hypotheses, Doppler hypotheses, and DOA hypotheses as every other point), then the processes at block 320 are reached. As previously noted, generally a radar system 110 either provides an initial point cloud IPC that is a point cloud PC (i.e., all points have the expected number of hypotheses) or an initial point cloud IPC in which none of the points include the expected number of hypotheses. For explanatory purposes, a mix of these scenarios is addressed by the exemplary case discussed herein.

In the exemplary case of a given initial point cloud IPC obtained (at block 215) from a given radar system 110, point P1 has the expected number of hypotheses (e.g., three hypotheses H1, H2, H3), point P2 is found to have only two of the three expected hypotheses H1 and H2, and points P3 and P4 each have only one value for range, Doppler, and DOA. At block 320, the processes include using the ambiguity function to obtain additional hypotheses for the points with an incomplete (e.g., fewer than three) number of hypotheses. In the exemplary case, the ambiguity function is used to obtain hypothesis H3 for point P2 and all three hypotheses H1, H2, H3 for points P3 and P4.

At block 330, obtaining a Mahalanobis distance d for some or all points in the initial point cloud IPC refers to obtaining the Mahalanobis distance d for every point in the initial point cloud IPC for the given radar system 110 that does not have the expected number of hypotheses, as shown in Table 2. The Mahalanobis distance d is given by:

$$dij = \sqrt{\frac{|Pi_R - Pj_R|^2}{\sigma_R^2} + \frac{|Pi_D - Pj_D|^2}{\sigma_D^2} + \frac{|Pi_{Az} - Pj_{Az}|^2}{\sigma_{Az}^2} + \frac{|Pi_{El} - Pj_{El}|^2}{\sigma_{El}^2}} \quad [\text{EQ. 1}]$$

In EQ. 1, R, D, Az, and El refer respectively to the range, Doppler, azimuth, and elevation that define the particular hypothesis. In addition, $\sigma_R$, $\sigma D$, $\sigma_{Az}$, $\sigma_{El}$ are an accuracy parameter associated, respectively, with range, Doppler, azimuth, and elevation for the given radar system 110. That is, $\sigma_R$, $\sigma_D$, $\sigma_{Az}$, $\sigma_{El}$ are the same for every calculation of the Mahalanobis distance d pertaining to the same radar system 110. As shown in Table 2, the index i indicates a point in the initial point cloud IPC that is not associated with hypotheses (e.g., points P3 and P4 in the example) or indicates a point and hypothesis for a point (e.g., point P2) that has fewer than expected hypotheses. For simplicity, each of the points P3 and P4 may be regarded as having a single hypothesis or estimate for range, Doppler, and DOA. Also, in Table 2, the index j indicates a point and hypothesis associated with a complete set based on the ambiguity function (at block 320). Thus, for example, the Mahalanobis distance d322 is between the point P3 (i.e., i=3) and the second hypothesis of the second point (i.e., j=22). As another example, d2243 is between the second hypothesis H2 of the second point P2 (i.e., i=22) and the third hypothesis H3 of the fourth point P4 (i.e., j=43), which is obtained at block 320 based on the ambiguity function.

As previously noted, Table 2 shows the Mahalanobis distances dij obtained between the points obtained without hypotheses or with an incomplete set of hypotheses (shown along the column in Table 2) and the full set of hypotheses based on the ambiguity function (shown along the row in Table 2). Points with the full set of hypotheses (e.g., point P1) are not part of the processes at blocks 320 through 340.

TABLE 2

Distances among points of an initial point cloud IPC.

|    |    | P2 |    |    | P3 |    |    | P4 |    |    |
|----|----|------|------|------|------|------|------|------|------|------|
|    |    | H1 | H2 | H3 | H1 | H2 | H3 | H1 | H2 | H3 |
| P2 | H1 | — | — | — | d2131 | d2132 | d2133 | d2141 | d2142 | d2143 |
|    | H2 | — | — | — | d2231 | d2232 | d2233 | d2241 | d2242 | d2243 |
| P3 |    | d321 | d322 | d323 | — | — | — | d341 | d342 | d343 |
| P4 |    | d421 | d422 | d423 | d431 | d432 | d433 | — | — | — |

At block 340, the processes include identifying points that are actually hypotheses rather than points. This may be based on examining the lowest distance value d, in turn, in Table 2, for example. In the exemplary case, based on the distance d323 (i.e., i=3 for point P3 and j=23 for hypothesis H3 of point P2) being the smallest value in Table 2, it may be determined that the point P3 in the initial point cloud IPC is actually the third hypothesis of the point P2. In this case, point P3 is removed as an independent point and used as the hypothesis H3 of point P2 in the resulting point cloud PC. As another example, none of the distances d4j (distances in the last row of Table 2) may be below a threshold value or the lowest values. In this case, the point P4 is retained as an independent point and the hypotheses H1, H2, H3 determined (at block 320) by using the ambiguity function are retained as the hypotheses of point P4 in the point cloud PC.

At block 350, generating a point cloud PC refers to providing all the points from the initial point cloud IPC that remain after the processes at blocks 320, 330, and 340. As indicated in FIG. 2, the point cloud PC from each radar system 110 is provided for the processes at block 230, which are further discussed with reference to FIG. 4.

Figure 4:
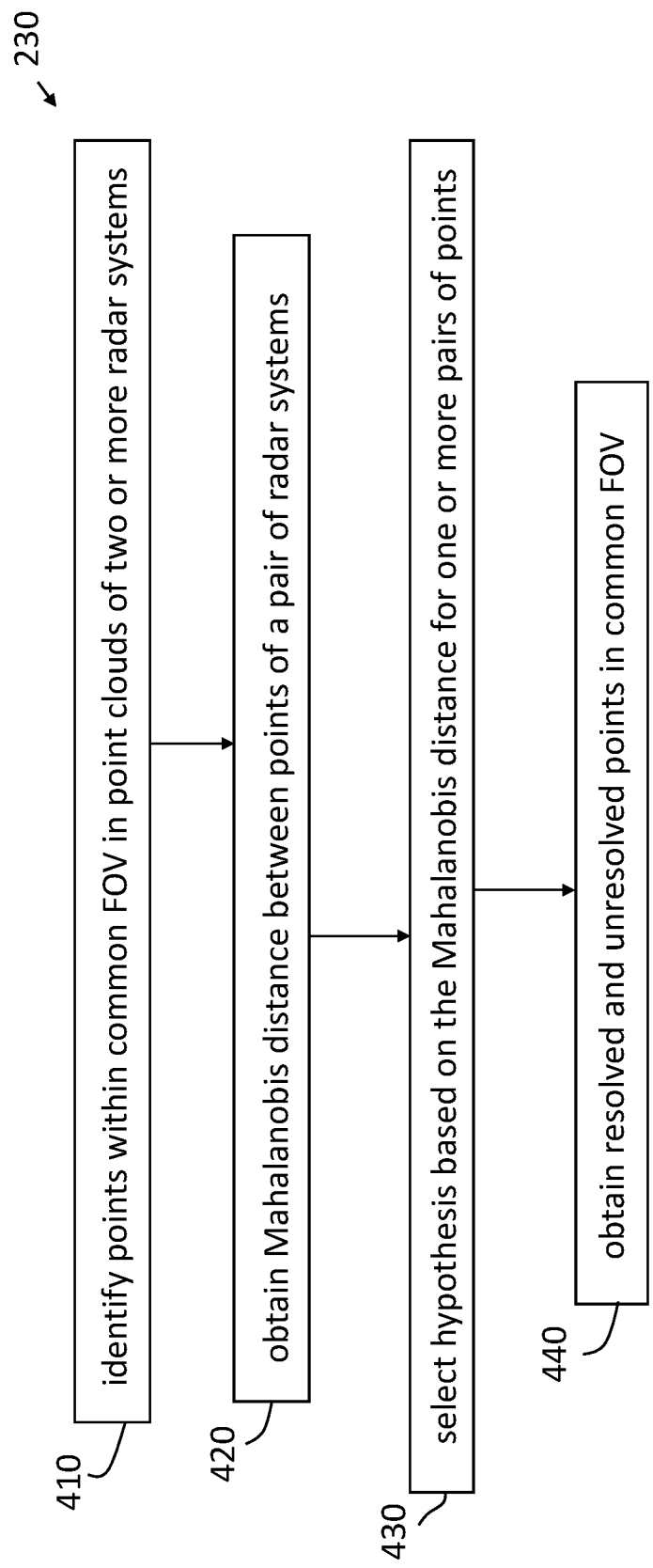
FIG. 4 indicates processes performed for another part of the process flow shown in FIG. 2 for two or more radar systems according to one or more embodiments.

FIG. 4 shows a process flow performed at block 230 (FIG. 2) for two or more radar systems 110 according to one or more embodiments. As previously noted, the processes at block 230 are performed for each common FOV 125 and, thus, involve points from the point clouds PCs of at least two radar systems 110. At block 410, the processes include identifying points within the common FOV 125 in point clouds PC of two or more radar systems 110. This identification may be based on the range and DOA values associated with the hypotheses of the points, for example.

In the exemplary case discussed herein for exemplary purposes, a first radar system 110 (e.g., radar system 110a in FIG. 1) is assumed to have three points Pa, Pb, Pc that are part of the same common FOV 125 as two points Px, Py of a second radar system 110 (e.g., radar system 110b in FIG. 1). If the example discussed with reference to FIG. 3 were continued, the three points P1, P2, P4, with three hypotheses each, that result from the processes at block 225 would be one of the points of one of the radar systems 110 shown in Table 3. The points Pa, Pb, Pc of the first radar system 110 may each have two hypotheses H1 and H2, while the points Px, Py of the second radar system 110 each have three hypotheses H1, H2, and H3.

At block 420, the processes include obtaining a Mahalanobis distance d between points (within the common FOV 125) of a pair of radar systems 110. In the exemplary case, the distances d are between points Pa, Pb, Pc of the first radar system 110 and points Px, Py of the second radar system 110, as shown in Table 3. Specifically, the points Pa, Pb, Pc of the first radar system 110 and their corresponding hypotheses H1 and H2 are shown along the top, and the points Px, Py of the second radar system 110 and their corresponding hypotheses H1, H2, and H3 are shown along the side. Each Mahalanobis distance dij, according to EQ. 1, is between a hypothesis (H1, H2, or H3) of one of the points Px or Py and a hypothesis (H1 or H2) of one of the points Pa, Pb, Pc, or Pd. For example, dx1a1 is the Mahalanobis distance between hypothesis H1 of point Px (i.e., i=x1) and hypothesis H1 of point Pa (j=a1). Similarly, dy3c2 is the Mahalanobis distance between hypothesis H3 of point Py (i.e., i=y3) and hypothesis H2 of point Pc (j=c2). In EQ. 1, the worst-case values between the two radar systems 110 are selected for the accuracy parameters $\sigma_R$, $\sigma_D$, $\sigma_{Az}$, $\sigma El$.

TABLE 3

Distances between points in a common field of view.

|    |    | Pa |    | Pb |    | Pc |    |
|----|----|------|------|------|------|------|------|
|    |    | H1 | H2 | H1 | H2 | H1 | H2 |
| Px | H1 | dx1a1 | dx1a2 | dx1b1 | dx1b2 | dx1c1 | dx1c2 |
|    | H2 | dx2a1 | dx2a2 | dx2b1 | dx2b2 | dx2c1 | dx2c2 |
|    | H3 | dx3a1 | dx3a2 | dx3b1 | dx3b2 | dx3c1 | dx3c2 |
| Py | H1 | dy1a1 | dy1a2 | dy1b1 | dy1b2 | dy1c1 | dy1c2 |
|    | H2 | dy2a1 | dy2a2 | dy2b1 | dy2b2 | dy2c1 | dy2c2 |
|    | H3 | dy3a1 | dy3a2 | dy3b1 | dy3b2 | dy3c1 | dy3c2 |

At block 430, the processes include selecting a hypothesis based on the Mahalanobis distance dij for one or more pairs of points. Candidate pairs may be selected and then checked, as detailed. The selection of a candidate pair may be the selection, in turn, of a Mahalanobis distance dij that is the lowest value, for example. Then a check (e.g., filtering, gating) may be done for the candidate pair to determine if the hypotheses of the two points in the pair may be selected as the same unambiguous hypothesis for that pair of points and other hypotheses for the pair of points may be eliminated.

For example, if the Mahalanobis distance dy3b2 (i.e., i=y3 and j=b2) is the lowest, then hypothesis H3 of point Py and hypothesis H2 of point Pb are a candidate pair of points. In that case, a check is done of whether all of the following are true with i=y3 and j=b2:

$$|Pi_R - Pj_R|^2 < \sigma_R^2 \qquad [\text{EQ. 2}]$$

$$|Pi_D - Pj_D|^2 < \sigma_D^2 \qquad [\text{EQ. 3}]$$

$$|Pi_{Az} - Pj_{Az}|^2 < \sigma_{Az}^2 \qquad [\text{EQ. 4}]$$

$$|Pi_{El} - Pj_{El}|^2 < \sigma_{El}^2 \qquad [\text{EQ. 5}]$$

The check represented by EQS. 2-5 ensures that the candidate pair of points have hypotheses that are similar in every domain (i.e., range, Doppler, and DOA). Since the candidate pair of points are associated with two different radar systems 110, the accuracy parameters $\sigma_R$, $\sigma_D$, $\sigma_{Az}$, $\sigma_{El}$ are not the same for both points. The worst-case scenario (i.e., higher value of the accuracy parameter) is used in each domain. If the check is met, then the hypotheses (e.g., hypothesis H3 of point Py and hypothesis H2 of point Pb in the example) are deemed to represent one unambiguous point and the other hypotheses are discarded.

Thus, in the exemplary case, hypotheses H1 and H2 for point Py and hypothesis H1 for point Pb may be discarded and points Py and Pb are considered resolved. Specifically, the range, Doppler, and DOA indicated by hypothesis H3 of point Py is retained for the point cloud of the second radar system 110 and hypothesis H2 of point Pb is retained for the point cloud of the first radar system 110. Some pairs of points in the common FOV 125 may not qualify as a candidate pair or may not pass the check represented by EQS. 2-5. Those points remain unresolved. At block 440, obtaining resolved and unresolved points in the common FOV 125 facilitates the further processing at block 240. Specifically, resolving ambiguity for at least a subset of the points in the common FOV 125 improves the accuracy of any subsequent application of the point clouds of each radar system 110.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method comprising:
   obtaining an initial point cloud for each of two or more radar systems that share a common field of view, wherein each initial point cloud results from processing reflected energy at each of the two or more radar systems and each point of the initial point cloud indicates one or more hypotheses for a range, a Doppler, and a direction of arrival (DOA) to an object that resulted in the reflected energy;
   obtaining a point cloud from the initial point cloud for each of the two or more radar systems, wherein each point of the point cloud for each of the two or more radar systems has a same number of hypotheses for the range as other points of the point cloud, a same number of hypotheses for the Doppler as other points of the point cloud, and a same number of hypotheses for the DOA as other points of the point cloud;
   resolving ambiguity in the common field of view based on the point cloud for each of the two or more radar systems to obtain resolved and unresolved points in the common field of view, wherein the resolved points indicate one value for the range, one value for the Doppler, and one value of the DOA;
   obtaining a radar image from each of the two or more radar systems based on the resolved and unresolved points in the common field of view, wherein the radar images are used to control an aspect of operation of a vehicle;
   controlling an aspect of operation of a vehicle using the radar image to avoid collision with the object.

2. The method according to claim 1, wherein the obtaining the point cloud from the initial point cloud includes, for each initial point cloud, determining a number of hypotheses for the range, a number of hypotheses for the Doppler, and a number of hypotheses for the DOA of each point of each initial point cloud, outputting the initial point cloud as the point cloud based on the number of hypotheses for the range being a first number for every point, the number of hypotheses for the Doppler being a second number for every point, and the number of hypotheses for the DOA being a third number for every point, and processing the initial point cloud to obtain the point cloud based on the number of hypotheses for the range being less than the first number for at least one point, the number of hypotheses for the Doppler being less than the second number for at least one point, or the number of hypotheses for the DOA being less than the third number for at least one point.

3. The method according to claim 2, wherein the processing the initial point cloud includes generating a subset of the initial point cloud to include each point that has fewer than the first number of hypotheses for the range, the second number of hypotheses for the Doppler, and the third number of hypotheses for the DOA and using an ambiguity function to obtain a complete subset of the initial point cloud that includes the first number of hypotheses for the range, the second number of hypotheses for the Doppler, and the third number of hypotheses for the DOA for each point in the subset of the initial point cloud.

4. The method according to claim 3, wherein the processing the initial point cloud includes obtaining a Mahalanobis distance between each point in the subset of the initial point cloud and each hypothesis in the complete subset of the initial point cloud and, based on the Mahalanobis distance, identifying each point in the subset of the initial point cloud that is a hypothesis in the complete subset of the initial point cloud.

5. The method according to claim 4, wherein the processing the initial point cloud includes discarding each point in the subset of the initial point cloud that is the hypothesis in the complete subset of the initial point cloud from the complete subset of the initial point cloud and retaining a remainder of the complete subset of the initial point cloud to generate the point cloud.

6. The method according to claim 1, further comprising identifying each point in the point cloud of each of the two or more radar systems that is in the common field of view.

7. The method according to claim 6, wherein the resolving the ambiguity in the common field of view includes obtaining, using the points in the common field of view for one of the two or more radar systems and another of the two or more radar systems at a time, a Mahalanobis distance between each hypothesis set of each point in the common field of view for the one of the two or more radar systems and each hypothesis set of each point in the common field of view for the other of the two or more radar systems, the hypothesis set including one combination of one of the one or more hypotheses for the range, one of the one or more hypotheses for the Doppler, and one of the one or more hypotheses for the DOA.

8. The method according to claim 7, wherein the resolving the ambiguity in the common field of view includes identifying a pair of points that result in a lowest Mahalanobis distance and, based on the pair of points passing a gating condition, retaining only the hypothesis set of the pair of points that is associated with the lowest Mahalonobis distance as unambiguous.

9. The method according to claim 8, wherein checking the gating condition for the pair of points includes using each of the range, the Doppler, and the DOA of the hypothesis set of the pair of points.

10. The method according to claim 1, wherein one or more objects is identified based on the radar image of one or more of the two or more radar systems.

11. A vehicle comprising:
two or more radar systems; and
a controller configured to obtain an initial point cloud for each of two or more radar systems that share a common field of view, wherein each initial point cloud results from processing reflected energy at each of the two or more radar systems and each point of the initial point cloud indicates one or more hypotheses for a range, a Doppler, and a direction of arrival (DOA) to an object that resulted in the reflected energy, to obtain a point cloud from the initial point cloud for each of the two or more radar systems, wherein each point of the point cloud for each of the two or more radar systems has a same number of hypotheses for the range as other points of the point cloud, a same number of hypotheses for the Doppler as other points of the point cloud, and a same number of hypotheses for the DOA as other points of the point cloud, to resolve ambiguity in the common field of view based on the point cloud for each of the two or more radar systems to obtain resolved and unresolved points in the common field of view, wherein the resolved points indicate one value for the range, one value for the Doppler, and one value of the DOA, to obtain a radar image from each of the two or more radar systems based on the resolved and unresolved points in the common field of view, wherein the radar images are used to control an aspect of operation of a vehicle; and
to control an aspect of operation of a vehicle using the radar image to avoid collision with the object.

12. The vehicle according to claim 11, wherein, for each initial point cloud, the controller is configured to obtain the point cloud by determining a number of hypotheses for the range, a number of hypotheses for the Doppler, and a number of hypotheses for the DOA of each point of each initial point cloud, outputting the initial point cloud as the point cloud based on the number of hypotheses for the range being a first number for every point, the number of hypotheses for the Doppler being a second number for every point, and the number of hypotheses for the DOA being a third number for every point, and processing the initial point cloud to obtain the point cloud based on the number of hypotheses for the range being less than the first number for at least one point, the number of hypotheses for the Doppler being less than the second number for at least one point, or the number of hypotheses for the DOA being less than the third number for at least one point.

13. The vehicle according to claim 12, wherein the controller is configured to process the initial point cloud by generating a subset of the initial point cloud to include each point that has fewer than the first number of hypotheses for the range, the second number of hypotheses for the Doppler, and the third number of hypotheses for the DOA and using an ambiguity function to obtain a complete subset of the initial point cloud that includes the first number of hypotheses for the range, the second number of hypotheses for the Doppler, and the third number of hypotheses for the DOA for each point in the subset of the initial point cloud.

14. The vehicle according to claim 13, wherein the controller is configured to process the initial point cloud by obtaining a Mahalanobis distance between each point in the subset of the initial point cloud and each hypothesis in the complete subset of the initial point cloud and, based on the Mahalanobis distance, identifying each point in the subset of the initial point cloud that is a hypothesis in the complete subset of the initial point cloud.

15. The vehicle according to claim 14, wherein the controller is configured to process the initial point cloud by discarding each point in the subset of the initial point cloud that is the hypothesis in the complete subset of the initial point cloud from the complete subset of the initial point cloud and retaining a remainder of the complete subset of the initial point cloud to generate the point cloud.

16. The vehicle according to claim 11, wherein the controller is also configured to identify each point in the point cloud of each of the two or more radar systems that is in the common field of view.

17. The vehicle according to claim 16, wherein the controller is configured to resolve the ambiguity in the common field of view by obtaining, using the points in the common field of view for one of the two or more radar systems and another of the two or more radar systems at a time, a Mahalanobis distance between each hypothesis set of each point in the common field of view for the one of the two or more radar systems and each hypothesis set of each point in the common field of view for the other of the two or more radar systems, the hypothesis set including one combination of one of the one or more hypotheses for the range, one of the one or more hypotheses for the Doppler, and one of the one or more hypotheses for the DOA.

18. The vehicle according to claim 17, wherein the controller is configured to resolve the ambiguity in the common field of view by identifying a pair of points that result in a lowest Mahalanobis distance and, based on the pair of points passing a gating condition, retaining only the hypothesis set of the pair of points that is associated with the lowest Mahalonobis distance as unambiguous.

19. The vehicle according to claim 18, wherein the controller is configured to check the gating condition for the pair of points includes using each of the range, the Doppler, and the DOA of the hypothesis set of the pair of points.

20. The vehicle according to claim 11, wherein the controller is configured to identify one or more objects based on the radar image of one or more of the two or more radar systems.

* * * * *